United States Patent
Gan et al.

(10) Patent No.: US 12,284,602 B2
(45) Date of Patent: *Apr. 22, 2025

(54) AID ALLOCATION METHOD FOR MULTI-LINK DEVICE AND RELATED APPARATUS

(71) Applicant: HUAWEI TECHNOLOGIES CO., LTD., Guangdong (CN)

(72) Inventors: Ming Gan, Shenzhen (CN); Yiqing Li, Shenzhen (CN); Yunbo Li, Shenzhen (CN); Yuchen Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,853

(22) Filed: Oct. 7, 2023

(65) Prior Publication Data

US 2024/0040492 A1 Feb. 1, 2024

Related U.S. Application Data

(63) Continuation of application No. 17/989,781, filed on Nov. 18, 2022, now Pat. No. 11,871,336, which is a (Continued)

(30) Foreign Application Priority Data

Jul. 1, 2020 (CN) .......................... 202010622036.9

(51) Int. Cl.
*H04W 4/00* (2018.01)
*H04W 48/16* (2009.01)
*H04W 88/10* (2009.01)

(52) U.S. Cl.
CPC ............ *H04W 48/16* (2013.01); *H04W 88/10* (2013.01)

(58) Field of Classification Search
CPC ...................................................... H04W 48/16
(Continued)

(56) References Cited

U.S. PATENT DOCUMENTS

| 2014/0064261 A1 | 3/2014 | Wang et al. |
| 2017/0118696 A1 | 4/2017 | Seok et al. |

(Continued)

FOREIGN PATENT DOCUMENTS

| CN | 1838626 A | 9/2006 |
| CN | 102905253 A | 1/2013 |

(Continued)

OTHER PUBLICATIONS

IEEE 802.11-20/0066r3, Young Hoon Kwon et al, Multi-Link TIM, Jan. 13, 2020, 16 pages.

(Continued)

*Primary Examiner* — Temica M Beamer (57) ABSTRACT

An AID allocation method for a multi-link device, includes: An access point multi-link device generates and sends a first frame. Correspondingly, a station device receives and parses the first frame to obtain an AID that is allocated to the station device and carried in the first frame. The AID is neither a BSSID that can be supported by a first-type access point in the access point multi-link device nor an identifier of an access point in the access point multi-link device. The first-type access point is an access point for establishing a link between the station device and the access point multi-link device.

20 Claims, 6 Drawing Sheets

Related U.S. Application Data continuation of application No. PCT/CN2021/103972, filed on Jul. 1, 2021.

(58) Field of Classification Search
USPC .......................................................... 370/328
See application file for complete search history.

(56) References Cited

U.S. PATENT DOCUMENTS

| | | |
|---|---|---|
| 2020/0059791 A1 | 2/2020 | Yang et al. |
| 2020/0120711 A1 | 4/2020 | Sevin et al. |
| 2020/0154443 A1 | 5/2020 | Patil et al. |

FOREIGN PATENT DOCUMENTS

| | | |
|---|---|---|
| CN | 103108391 A | 5/2013 |
| CN | 103228046 A | 7/2013 |
| CN | 103348742 A | 10/2013 |
| CN | 104363581 A | 2/2015 |
| CN | 105979608 A | 9/2016 |
| CN | 108810879 A | 11/2018 |
| CN | 110521251 A | 11/2019 |
| CN | 110547026 A | 12/2019 |
| JP | 2020053990 A | 4/2020 |
| JP | 2023527813 A | 6/2023 |
| RU | 2632401 C2 | 10/2017 |
| WO | 2013067941 A1 | 5/2013 |
| WO | 2017038193 A1 | 3/2017 |
| WO | 2018085635 A1 | 5/2018 |

OTHER PUBLICATIONS

IEEE 802.11-20/0770r0, Young Hoon Kwon et al, MLO: AID Allocation, Apr. 28, 2020, 8 pages.
IEEE 802.11-21/1185r5, Abhishek Patil et al, CC36 Resolution for CIDs related to Multiple BSSID (Part 2), Feb. 2022, 8 pages.

AID ALLOCATION METHOD FOR MULTI-LINK DEVICE AND RELATED APPARATUS

CROSS-REFERENCE TO RELATED APPLICATIONS

This application is a continuation of U.S. patent application Ser. No. 17/989,781, filed on Nov. 18, 2022, which is a continuation of International Application No. PCT/CN2021/103972, filed on Jul. 1, 2021, which claims priority to Chinese Patent Application No. 202010622036.9, filed on Jul. 1, 2020. All of the afore-mentioned patent applications are hereby incorporated by reference in their entireties.

TECHNICAL FIELD

This application relates to the field of wireless communication technologies, and in particular, to an AID allocation method for a multi-link device and a related apparatus.

BACKGROUND

An association identifier (AID) is an identifier (ID) allocated by an access point (AP) to an associated station (STA) after establishing an association, and may be considered as an ID of the associated STA. The AID may be used to identify and distinguish STAs associated with the AP, and may be used as an index in some frame structures to point to a specific associated STA. If the AP can support a plurality of basic service set identifiers (BSSIDs), or a beacon frame or a probe response frame to carry a multiple BSSID element, a maximum quantity of BSSIDs that the AP can support is $2^n$. This indicates that a range of the BSSID is $[1, 2^n-1]$. Therefore, a range of AIDs that can be allocated by the AP to the STA is $[2^n, 2007]$. n may be a value of a max BS SID indicator field of the BSSID element. If the AP cannot support a plurality of BSSIDs, or the beacon frame or the probe response frame cannot carry a plurality of BSSID elements, the range of AIDs that can be allocated by the AP to the STA is $[1, 2007]$.

In a multi-link device (MLD), a plurality of STAs included in one non-access point (non-AP) MLD share one same AID, that is, one non-AP MLD has only one AID. Because the AP MLD may perform a cross-link traffic indication map (TIM) indication. In other words, it is assumed that an AP 1 and an AP 2 belong to a same AP MLD. The cross-link TIM indication sent by the AP 1 may not only carry TIM information of the AP 1, but also carry TIM information of the AP 2. The TIM information may indicate whether an AP has a service for a non-AP MLD associated with the AP 2. However, in some cases, AID ambiguity may occur when the AP MLD uses the cross-link TIM indication. For example, it is assumed that the AP 1 and the AP 2 belong to the same AP MLD. If a beacon frame or a probe response frame of the AP 1 includes a multiple BSSID element, it indicates that the AP 1 can support a plurality of BSSIDs. If a beacon frame or a probe response frame of the AP 2 does not include a multiple BSSID element, it indicates that the AP 2 cannot support a plurality of BSSIDs and has only one BSSID. In this case, a range of AIDs allocated by the AP 1 to a non-AP MLD associated with the AP 1 is $[2^n, 2007]$, and a range of AIDs allocated by the AP 2 to the non-AP MLD associated with the AP 2 is $[1, 2007]$. In this case, when the AP MLD uses the cross-link TIM indication, because the cross-link TIM indication not only carries the TIM information of the AP 1, but also carries the TIM information of the AP 2, a BSSID supported by the AP 1 may conflict with the AID allocated by the AP 2 to the non-AP MLD associated with the AP 2. In other words, a range of a plurality of BSSIDs of the AP 1 is $[1, 2^n-1]$, and a range of AIDs of the non-AP MLD associated with AP 2 is also $[1, 2^n-1]$. Therefore, when receiving the cross-link TIM indication sent by the AP MLD, the non-AP MLD cannot determine whether a non-AP MLD whose range of AIDs is $[1, 2^n-1]$ has a service (because this part of AID is the same as the BSSID of the AP 1), that is, the AID is ambiguous. Therefore, if one or more APs in the AP MLD can support a plurality of BSSIDs, how the AP MLD allocates an AID to the non-AP MLD to avoid AID ambiguity during cross-link TIM indication becomes an urgent problem to be resolved.

SUMMARY

Embodiments of this application provide an AID allocation method for a multi-link device and a related apparatus, to allocate a more accurate AID to a station device, thereby avoiding AID ambiguity in a cross-link TIM indication.

The following describes this application from different aspects. It should be understood that mutual reference may be made to the following implementations and beneficial effects of the different aspects.

According to a first aspect, an embodiment of this application provides an AID allocation method for a multi-link device, where the AID allocation method for the multi-link device includes: The access point multi-link device generates and sends a first frame, where the first frame may carry an AID allocated to a station device. The AID is neither a BSSID that can be supported by a first-type access point in the access point multi-link device nor an identifier of an access point in the access point multi-link device. The first-type access point is an access point for establishing a link between the station device and the access point multi-link device.

Optionally, the first frame may be an association response frame or a multi-link
association response frame.

Optionally, before the access point multi-link device sends the first frame, the station device sends the association request frame or the multi-link association request frame to the access point multi-link device, to request to establish an association relationship with the access point multi-link device. After the access point multi-link device receives the association request frame or the multi-link association request frame, the access point multi-link device may return the association response frame or the multi-link association response frame to the station device.

In this solution, when the AID is allocated to the station device, a BSSID that has been allocated to an AP and/or a BSSID that can be supported by the first-type AP is not allowed to be allocated to a non-AP MLD. Therefore, a more accurate AID can be allocated to the non-AP MLD, and this avoids AID ambiguity in a cross-link TIM indication.

According to a second aspect, an embodiment of this application provides an AID allocation method for a multi-link device, where the AID allocation method for a multi-link device includes: A station device receives parsing a first frame to obtain an AID that is allocated to the station device and carried in the first frame. The AID is neither a BSSID that can be supported by a first-type access point in an access point multi-link device nor an identifier of an access point in the access point multi-link device. The first-type access point is an access point for establishing a link between the station device and the access point multi-link device.

Optionally, the first frame may be an association response frame or a multi-link association response frame.

Optionally, before the access point multi-link device sends the first frame, the station device may generate and send the association request frame or the multi-link association request frame, to request to establish an association relationship with the access point multi-link device. After the access point multi-link device receives the association request frame or the multi-link association request frame, the access point multi-link device may return the association response frame or the multi-link association response frame to the station device.

According to a third aspect, an embodiment of this application provides a communication apparatus. The communication apparatus may be an access point multi-link device or a chip in an access point multi-link device, for example, a Wi-Fi chip, and includes:

a processing unit, configured to generate a first frame; and a transceiver unit, configured to send the first frame, where the first frame may carry an AID allocated to a station device. The AID is neither a BSSID that can be supported by a first-type access point in the access point multi-link device nor an identifier of an access point in the access point multi-link device. The first-type access point is an access point for establishing a link between the station device and the access point multi-link device.

Optionally, the first frame may be an association response frame or a multi-link association response frame.

Optionally, the station device may send the association request frame or the multi-link association request frame to the access point multi-link device, to request to establish an association relationship with the access point multi-link device. After the access point multi-link device receives the association request frame or the multi-link association request frame, the access point multi-link device may return the association response frame or the multi-link association response frame to the station device.

According to a fourth aspect, an embodiment of this application provides a communication apparatus. The communication apparatus may be a station device or a chip in a station device, for example, a Wi-Fi chip, and includes:

a transceiver unit, configured to receive a first frame; and a processing unit, configured to parse the first frame to obtain an AID that is allocated to the station device and carried in the first frame. The AID is neither a BSSID that can be supported by a first-type access point in an access point multi-link device nor an identifier of an access point in the access point multi-link device. The first-type access point is an access point for establishing a link between the station device and the access point multi-link device.

Optionally, the first frame may be an association response frame or a multi-link association response frame.

Optionally, the station device may send the association request frame or the multi-link association request frame to the access point multi-link device, to request to establish an association relationship with the access point multi-link device. After the access point multi-link device receives the association request frame or the multi-link association request frame, the access point multi-link device may return the association response frame or the multi-link association response frame to the station device.

In an implementation of any one of the foregoing aspects, the BSSID that can be supported by the first-type access point in the foregoing access point multi-link device is:

$$[1, \max(2^{n_1}, 2^{n_2}, \ldots, 2^{n_i}, \ldots, 2^{n_N})-1].$$

N may be a quantity of first-type access points, and $2^{n_i}$ may represent a quantity of BSSIDs that can be supported by an $i^{th}$ access point in the first-type access points. N may be a positive integer greater than 1.

Optionally, the identifier of the access point in the access point multi-link device may include M discrete integer values, or include M consecutive integer values. M may be a quantity of access points included in the access point multi-link device, and M may be a positive integer greater than 1. N may be less than or equal to M.

In this solution, BSSIDs that can be supported by some APs in the access point multi-link device are not allowed to be allocated to the station device, so that a range in which allocation is not allowed is narrowed down if it is ensured that no AID ambiguity occurs in a cross-link TIM indication. In this way, a range of AIDs that can be allocated to the station device is expanded, and utilization of identifier resources can be improved.

In an implementation of any one of the foregoing aspects, the AID carried in the first frame is not any value in the following range:

$$[1, \max(2^{n_1}, 2^{n_2}, \ldots, 2^{n_i}, \ldots, 2^{n_N})-1+M].$$

N may be the quantity of the first-type access points, $2^{n_i}$ may represent a quantity of BSSIDs that can be supported by the first-type access point, and M is a quantity of access points of the access point multi-link device.

In this solution, a segment of consecutive values following the BSSID that can be supported by the first-type access point in the access point multi-link device is directly used as the identifier of the access point in the access point multi-link device. In other words, the identifier of the access point in the access point multi-link device and the BSSIDs that can be supported by the first-type access point may form a consecutive range, and the AID carried in the first frame cannot be any value in the consecutive range. Therefore, the access point multi-link device may allocate consecutive AIDs to the station device, thereby reducing difficulty in selecting an AID by the access point multi-link device.

According to a fifth aspect, an embodiment of this application provides a communication apparatus, which is specifically an access point multi-link device and includes a processor and a transceiver. The processor is configured to support the access point multi-link device in performing a corresponding function in the method in the first aspect. The transceiver is configured to: support communication between the access point multi-link device and a station device, and send information, a frame, a data packet, instructions, or the like in the foregoing method to the station device. The access point multi-link device may further include a memory. The memory is configured to be coupled to a processor, and the memory stores program instructions and data that are necessary for the access point multi-link device.

Specifically, the processor is configured to generate a first frame. The transceiver is configured to send the first frame, where the first frame carries an AID allocated to the station device. The AID is neither a BSSID that can be supported by a first-type access point in the access point multi-link device nor an identifier of an access point in the access point multi-link device. The first-type access point is an access point for establishing a link between the station device and the access point multi-link device.

According to a sixth aspect, an embodiment of this application provides a communication apparatus, which is specifically a station device and includes a processor and a transceiver. The transceiver is configured to receive a first frame, and the processor is configured to parse the received first frame to obtain an AID that is allocated to the station device and carried in the first frame. The AID is neither a BSSID that can be supported by a first-type access point in the access point multi-link device nor an identifier of an access point in the access point multi-link device. The first-type access point is an access point for establishing a link between the station device and the access point multi-link device. Optionally, the communication apparatus may further include a processor. The processor may be configured to generate an association request frame or a multi-link association request frame. The access point multi-link device may further include a memory. The memory is configured to be coupled to a processor, and the memory stores program instructions and data that are necessary for the access point multi-link device.

According to a seventh aspect, an embodiment of this application provides a chip or a chip system, including an input/output interface and a processing circuit. The processing circuit is configured to generate a first frame. The input/output interface is configured to send the first frame, where the first frame carries an AID allocated to a station device. The AID is neither a BSSID that can be supported by a first-type access point in an access point multi-link device nor an identifier of an access point in the access point multi-link device. The first-type access point is an access point for establishing a link between the station device and the access point multi-link device.

In a possible design, the input/output interface is configured to receive the first frame from the AP MLD. The processing circuit is configured to parse the received first frame to obtain the AID that is allocated to the station device and carried in the first frame. The AID is neither the BSSID that can be supported by the first-type access point in the access point multi-link device nor the identifier of the access point in the access point multi-link device. The first-type access point is the access point for establishing the link between the station device and the access point multi-link device.

According to an eighth aspect, this application provides a computer-readable storage medium. The computer-readable storage medium stores instructions. When the instructions are run on a computer, the computer is enabled to perform the AID allocation method for the multi-link device according to any one of the foregoing aspects.

According to a ninth aspect, this application provides a computer program product including instructions, and when the instructions are run on a computer, the computer is enabled to perform the AID allocation method for the multi-link device according to any one of the foregoing aspects.

According to embodiments of this application, a more accurate AID can be allocated to the station device, thereby avoiding AID ambiguity in the cross-link TIM indication.

BRIEF DESCRIPTION OF DRAWINGS

To describe the technical solutions in embodiments of this application more clearly, the following briefly describes the accompanying drawings used for describing embodiments.

DESCRIPTION OF EMBODIMENTS

The following clearly and completely describes the technical solutions in embodiments of this application with reference to the accompanying drawings in embodiments of this application.

For ease of understanding the technical solutions in embodiments of this application, the following briefly describes a system architecture of an AID allocation method for a multi-link device provided in embodiments of this application. It may be understood that a system architecture described in embodiments of this application is intended to describe the technical solutions in embodiments of this application more clearly, and do not constitute a limitation on the technical solutions provided in embodiments of this application.

Embodiments of this application provide an AID allocation method for a multi-link device applied to a wireless communication system, to allocate a more accurate AID to a station device, thereby avoiding AID ambiguity in a cross-link TIM indication. The wireless communication system may be a wireless local area network or a cellular network. The AID allocation method may be implemented by a communication device in the wireless communication system or a chip or a processor in the communication device. The communication device may be a wireless communication device that supports concurrent transmission on a plurality of links. For example, the communication device may be referred to as a multi-link device or a multi-band device. Compared with a communication device that supports only single-link transmission, the multi-link device has higher transmission efficiency and a higher throughput.

The multi-link device includes one or more affiliated stations (affiliated STA). The affiliated station is a logical station and may work on one link. The affiliated station may be an access point (AP) or a non-access point station (non-AP STA). For ease of description, in this application, a multi-link device whose affiliated station is an AP may be referred to as a multi-link AP, a multi-link AP device, or an AP multi-link device (AP MLD), and a multi-link device whose affiliated station is a non-AP STA may be referred to as a multi-link non-AP, a multi-link non-AP device, or a non-AP multi-link device (non-AP MLD). For ease of description, "the multi-link device includes an affiliated station" is also briefly described as "the multi-link device includes a station" in the embodiments of this application.

The multi-link device includes one or more affiliated stations (affiliated STA). In other words, one multi-link device may include a plurality of logical stations. Each logical station works on one link, but a plurality of logical stations can work on a same link. During data transmission, an AP MLD and a non-AP MLD may use a link identifier to identify a link or a station on a link. Before communication, the AP MLD and the non-AP MLD may first negotiate or communicate with each other on a correspondence between a link identifier and a link or a station on a link. Therefore, during data transmission, the link identifier is carried without transmitting a large amount of signaling information to indicate the link or the station on the link. This reduces signaling overheads and improves transmission efficiency.

In an example, when the AP MLD establishes a basic service set (BSS), a sent management frame, for example, a beacon frame, carries elements including a plurality of link identifier information fields. Each link identifier information field includes a link identifier, and further includes one or more of a BSS identifier, an operation set, and a channel number. The one or more of the BSS identifier, the operation set, and the channel number correspond to the link identifier. In another example, in a process of establishing a multi-link association, the AP MLD and the non-AP MLD negotiate on a plurality of link identifier information fields. In subsequent communication, the AP MLD or non-AP MLD uses link identifiers to represent stations at both ends of a corresponding link. The link identifier may further represent one or more attributes of a MAC address, a working operation set, and a channel number of the station. The MAC address may also be replaced with an association identifier (AID) of an associated AP MLD.

If a plurality of stations work on one link, the link identifier (which is a numeric ID) not only represents an operation set and a channel number in which the link is located, but also represents an identifier of a station working on the link, for example, a MAC address or an association identifier AID of the station.

The multi-link device may implement wireless communication in compliance with the IEEE 802.11 series protocols. For example, the multi-link device may be a station in compliance with the extremely high throughput rate, based on IEEE 802.11be, or compatible with IEEE 802.11be, to implement communication with other devices. Certainly, the other devices may be multi-link devices, or may not be multi-link devices.

The AID allocation method for the multi-link device provided in embodiments of this application may be applied to a scenario in which one node communicates with one or more nodes, may be applied to a single-user uplink/downlink communication scenario or a multi-user uplink/downlink communication scenario, or may be applied to a device to device (D2D) communication scenario.

Any one of the foregoing nodes may be an AP MLD, or may be a non-AP MLD. For example, the AID allocation method is applied to a scenario in which an AP MLD communicates with a non-AP MLD, applied to a scenario in which a non-AP MLD communicates with a non-AP MLD, or applied to a scenario in which an AP MLD communicates with an AP MLD. This is not limited in the embodiments of this application. Optionally, one of the foregoing nodes may be a multi-link device, and the other nodes may be multi-link devices, or may not be multi-link devices. For example, the AID allocation method is applied to a scenario in which the AP MLD communicates with a single-link device. The single-link device may be a STA.

For ease of description, a scenario in which the AP MLD communicates with the STA is used as an example below to describe the system architecture of this application. It may be understood that the STA herein is in a broad sense, refers to a STA side, and may be a single-link STA or a non-AP MLD.

Figure 1:
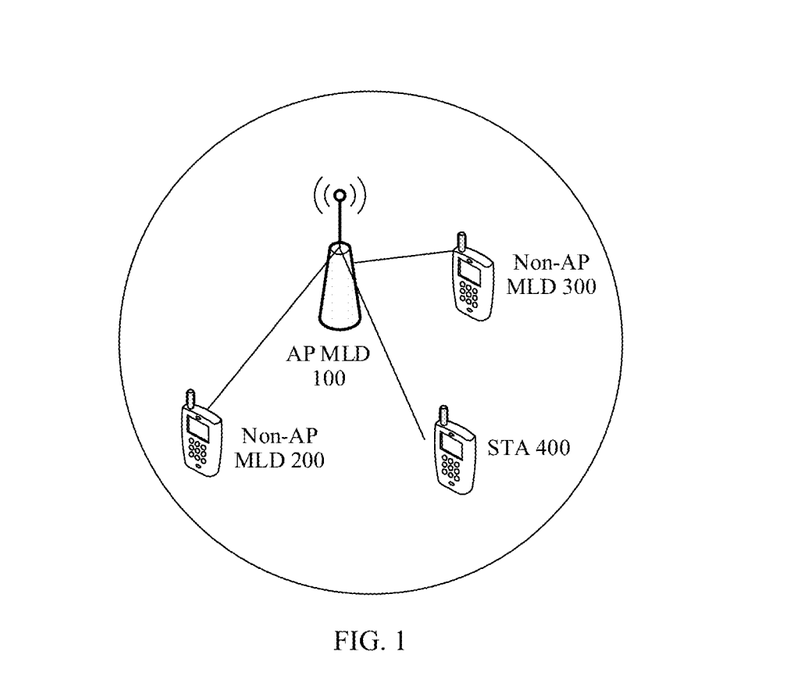
FIG. 1 is a schematic architectural diagram of a wireless communication system according to an embodiment of this application.

FIG. 1 is a schematic architectural diagram of a wireless communication system according to an embodiment of this application. FIG. 1 describes an application scenario of an embodiment of this application by using a wireless local area network as an example. The wireless communication system shown in FIG. 1 includes an AP multi-link device 100 and a non-AP multi-link device 200. The AP multi-link device is a multi-link device that provides a service for the non-AP multi-link device, and the non-AP multi-link device may communicate with the AP multi-link device by using a plurality of links, to improve a throughput rate. Certainly, the wireless communication system may further include other devices, for example, a non-AP multi-link device 300 and a single-link STA 400. A quantity of AP multi-link devices and a quantity of non-AP multi-link devices in FIG. 1 are merely an example.

Figure 2A:
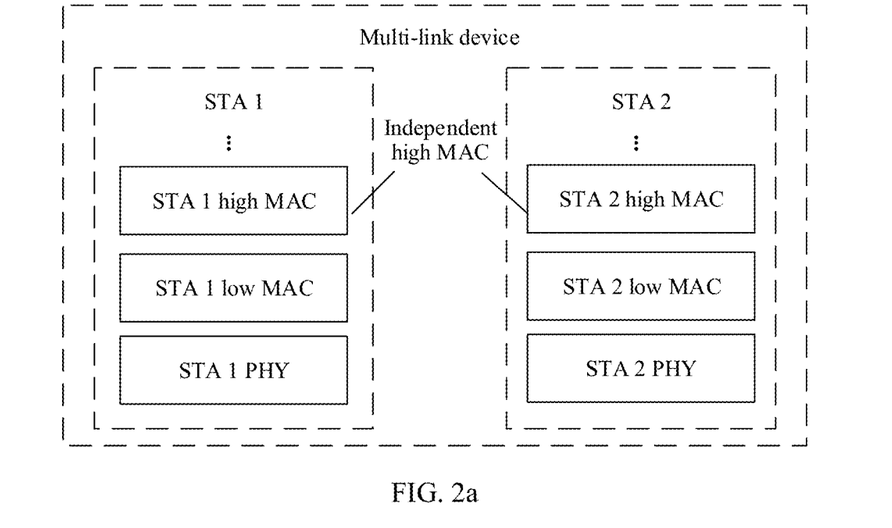
FIG. 2a is a schematic diagram of a structure of a multi-link device according to an embodiment of this application.
Figure 2B:
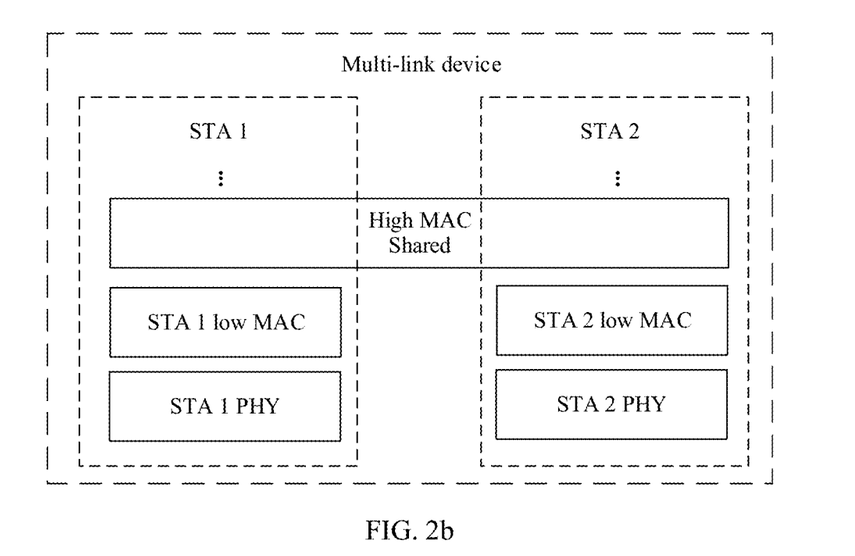
FIG. 2b is a schematic diagram of another structure of a multi-link device according to an embodiment of this application.

Optionally, FIG. 2a is a schematic diagram of a structure of a multi-link device according to an embodiment of this application. The IEEE 802.11 standard focuses on an 802.11 physical layer (PHY) part and a media access control (MAC) layer part in a multi-link device. As shown in FIG. 2a, a plurality of STAs included in the multi-link device are independent of each other at a low MAC layer and a PHY layer, and are also independent of each other at a high MAC layer. FIG. 2b is a schematic diagram of another structure of a multi-link device according to an embodiment of this application. As shown in FIG. 2b, a plurality of STAs included in the multi-link device are independent of each other at a low MAC layer and a PHY layer, and share a high MAC layer. Certainly, in a multi-link communication process, a non-AP multi-link device may use a structure in which high MAC layers are independent of each other, and an AP multi-link device uses a structure in which high MAC layers are shared. Alternatively, a non-AP multi-link device may use a structure in which high MAC layers are shared, and an AP multi-link device use a structure in which high MAC layers are independent of each other. Alternatively, both a non-AP multi-link device and an AP multi-link device may use a structure in which high MAC layers are shared. Alternatively, a non-AP multi-link device and an AP multi-link device may both use a structure in which high MAC layers are independent of each other. A schematic diagram of an internal structure of the multi-link device is not limited in this embodiment of this application. FIG. 2a and FIG. 2b are merely examples for description. For example, the high MAC layer or the low MAC layer may be implemented by one processor in a chip system of the multi-link device, or may be implemented by different processing modules in a chip system.

For example, the multi-link device in this embodiment of this application may be a single-antenna device, or may be a multi-antenna device. For example, the multi-link device may be a device with more than two antennas. The quantity of antennas included in the multi-link device is not limited in this embodiment of this application. In this embodiment of this application, the multi-link device may allow services of a same access type to be transmitted on different links, or even allow same data packets to be transmitted on different links. Alternatively, the multi-link device may not allow services of a same access type to be transmitted on different links, but may allow services of different access types to be transmitted on different links.

A frequency band in which the multi-link device works may include one or more frequency bands of sub 1 GHz, 2.4 GHz, 5 GHz, 6 GHz, and a high frequency 60 GHz.

Figure 3A:
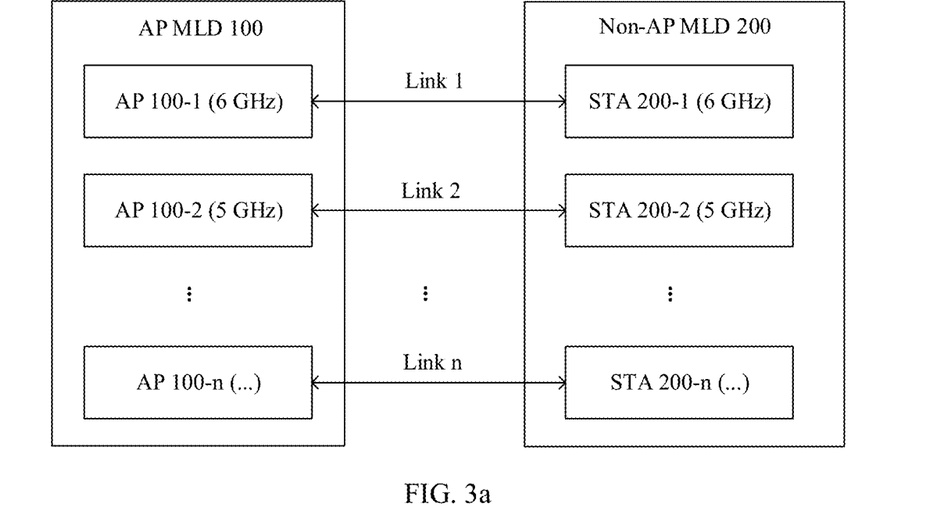
FIG. 3a is a schematic diagram of multi-link communication according to an embodiment of this application.

Optionally, FIG. 3a is a schematic diagram of multi-link communication according to an embodiment of this application. FIG. 3a is a schematic diagram of communication between an AP MLD 100 and a non-AP MLD 200. As shown in FIG. 3a, the AP MLD 100 includes n affiliated stations: an AP 100-1, an AP 100-2, . . . , and an AP 100-n. The non-AP MLD 200 includes n affiliated stations: a STA 200-1, a STA 200-2, . . . , and a STA 200-n. The AP MLD 100 and the non-AP MLD 200 communicate concurrently through a link 1, a link 2, . . . , and a link n. An AP in an AP MLD may establish a link with a STA in a non-AP MLD for communication. For example, the AP 100-1 in the AP MLD 100 establishes the link 1 with the STA 200-1 in the non-AP MLD 200 for communication, the AP 100-2 in the AP MLD 100 establishes the link 2 with the STA 200-2 in the non-AP MLD 200 for communication, and so on.

Figure 3B:
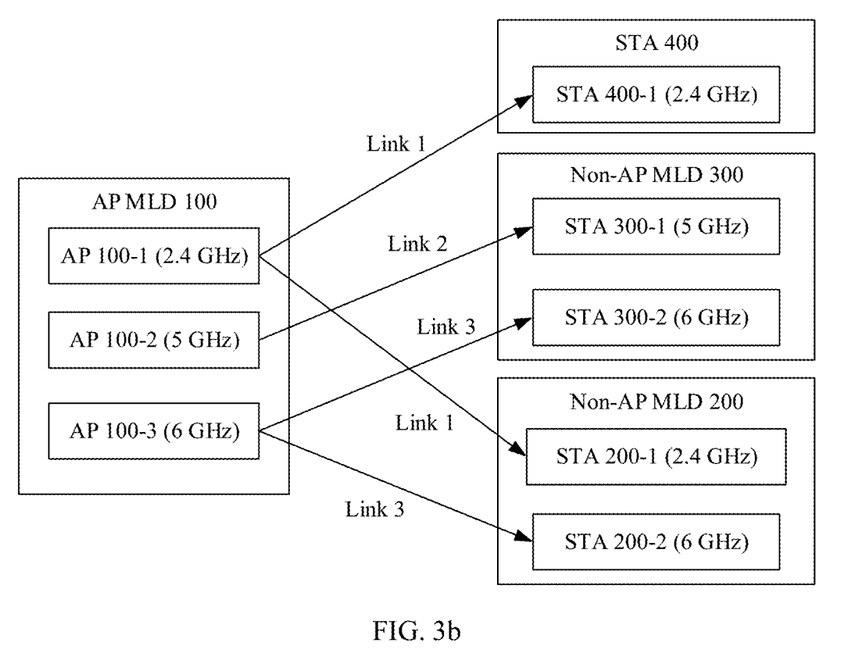
FIG. 3b is another schematic diagram of multi-link communication according to an embodiment of this application.

FIG. 3b is another schematic diagram of multi-link communication according to an embodiment of this application. FIG. 3b is a schematic diagram in which an AP MLD 100 communicates with a non-AP MLD 200, a non-AP MLD 300, and a STA 400. As shown in FIG. 3b, it is assumed that the AP MLD 100 includes three affiliated stations: an AP 100-1 to an AP 100-3. The non-AP MLD 200 includes two affiliated stations: a STA 200-1 and a STA 200-2. The non-AP MLD 300 includes two affiliated stations: a STA 300-1 and a STA 300-2. The STA 400 is a single-link device. The AP MLD 100 may separately communicate with the non-AP MLD 200 through a link 1 and a link 3, communicate with the non-AP MLD 300 through a link 2 and the link 3, and communicate with the STA 400 through the link 1.

In an example, the STA 400 works in a 2.4 GHz frequency band. The STA 300-1 included in the non-AP MLD 300 works in a 5 GHz frequency band, and the STA 300-2 included in the non-AP MLD 300 works in a 6 GHz frequency band. The STA 200-1 included in the non-AP MLD 200 works in a 2.4 GHz frequency band, and the STA 200-2 included in the non-AP MLD 200 works in a 6 GHz frequency band. The AP 100-1 that works in the 2.4 GHz frequency band and that is in the AP MLD 100 may transmit uplink or downlink data to the STA 400 and the STA 200-2 in the non-AP MLD 200 through the link 1. The AP 100-2 that works in the 5 GHz frequency band and that is in the AP MLD 100 may transmit uplink or downlink data to the STA 300-1 that works in the 5 GHz frequency band and that is in the non-AP MLD 300 through the link 2. The AP 100-3 that works in the 6 GHz frequency band and that is in the AP MLD 100 may transmit uplink or downlink data to the STA 200-2 that works in the 6 GHz frequency band and that is in the non-AP MLD 200 through the link 3, or may transmit uplink or downlink data to the STA 300-2 in the non-AP MLD 300 through the link 3.

For example, the multi-link device (such as any one of the multi-link devices AP MLD 100, the non-AP MLD 200, and the non-AP MLD 300 in FIG. 1) is an apparatus having a wireless communication function. The apparatus may be a complete device, or may be a chip, a processing system, or the like installed in the complete device. The device installed with the chip or the processing system can implement the method and the function in the embodiments of this application under control of the chip or the processing system. For example, the non-AP multi-link device in the embodiments of this application has a wireless transceiver function, may support the 802.11 series protocols, and may communicate with the AP multi-link device or another non-AP multi-link device. For example, the non-AP multi-link device is any user communication device that allows a user to communicate with an AP and then communicate with a WLAN. For example, the non-AP multi-link device may be user equipment that can be connected to a network, such as a tablet computer, a desktop computer, a laptop computer, a notebook computer, an ultra-mobile personal computer (UMPC), a handheld computer, a netbook, a personal digital assistant (PDA), or a mobile phone, may be an internet of things node in the internet of things, or may be a vehicle-mounted communication apparatus in the internet of vehicles. The non-AP multi-link device may alternatively be a chip and a processing system in the foregoing terminals. The AP multi-link device in the embodiments of this application is an apparatus that serves the non-AP multi-link device, and may support the 802.11 series protocols. For example, the AP multi-link device may be a communication entity such as a communication server, a router, a switch, or a bridge, or the AP multi-link device may include various forms of macro base stations, micro base stations, relay stations, and the like. Certainly, the AP multi-link device may alternatively be chips and processing systems in the various forms of devices, to implement the method and function in the embodiments of this application.

It can be understood that the multi-link device may support high-rate and low-latency transmission. With continuous evolution of application scenarios of a wireless local area network, the multi-link device may be further applied to more scenarios, for example, a sensor node (for example, a smart meter, a smart electricity meter, and a smart air detection node) in a smart city, a smart device (for example, a smart camera, a projector, a display, a TV, a stereo, a refrigerator, and a washing machine) in smart home, a node in the internet of things, an entertainment terminal (for example, a wearable device such as an AR and a VR), a smart device (such as a printer and a projector) in a smart office, an IoV device in the internet of vehicles, and some infrastructures (for example, a vending machine, a self-service navigation station of a supermarket, a self-service cash register device, and a self-service ordering machine) in daily life scenarios. Specific forms of the non-AP multi-link device and the AP multi-link device are not limited in the embodiments of this application, and are merely described as examples herein. The 802.11 protocol may be a protocol that supports 802.11be or is compatible with 802.11be.

The foregoing content briefly describes a system architecture of the AID allocation method for the multi-link device provided in embodiments of this application. For better understanding of the technical solutions of this application, the following describes the technical solutions of this application in detail with reference to a possible application scenario of embodiments of this application.

In a wireless communication system, an identifier of an AP MLD is 0 by default, and a plurality of APs in the AP MLD share the identifier (that is, the identifier 0). Therefore, which AP in the AP MLD sends a message/information/radio frame cannot be identified. Therefore, this embodiment of this application provides an allocation method for an identifier of an AP MLD, to allocate different identifiers to APs to identify the APs, so that messages/information/radio frames and the like sent by different APs are distinguished by using the identifiers of the APs. An implementation is as follows: The AP MLD allocates different identifiers to different APs, for example, directly indicates an identifier of each AP. The identifiers of the APs in the same AP MLD may be consecutive integer values, or may be inconsecutive integer values. For example, the AP MLD includes five APs in total: an AP 1, an AP 2, an AP 3, an AP 4, and an AP 5. An identifier allocated to the AP 1 may be 1, an identifier allocated to the AP 2 may be 5, an identifier allocated to the AP 3 may be 4, an identifier allocated to the AP 4 may be 7, and an identifier allocated to the AP 5 may be 3. In another implementation, the AP MLD directly indicates a start identifier and an end identifier for M access points. For example, the identifiers allocated by the AP MLD to the M access points are from $\max(2^{n_1}, 2^{n_2}, \ldots, 2^{n_M})$ to $\max(2^{n_1}, 2^{n_2}, \ldots, 2^{n_M})+M$. In other words, an identifier range of the AP MLD is $[\max(2^{n_1}, 2^{n_2}, \ldots, 2^{n_M}), \max(2^{n_1}, 2^{n_2}, \ldots, 2^{n_M})+M]$. $2^{n_1}$ represents a quantity of BSSIDs that can be supported by a first AP in the AP MLD. $2^{n_2}$ represents a quantity of BSSIDs that can be supported by a second AP in the AP MLD. $2^{n_M}$ represents a quantity of BSSIDs that can be supported by an $M^{th}$ AP in the AP MLD.

An identifier of each AP in the AP MLD, a BSSID that can be supported by each AP, and an AID allocated by the AP MLD to a non-AP MLD use a same identification system. For example, the identifier of each AP, the BSSID that can be supported by each AP, and the AID of the non-AP MLD are all integer values obtained from a range [1, 2007].

Therefore, this embodiment of this application provides an AID allocation method for a multi-link device, to allocate a more accurate AID to a station device, thereby avoiding AID ambiguity in a cross-link TIM indication.

It may be understood that the station device in this application may be a non-AP multi-link device, or may be a single-link STA device. For ease of description, the following uses an example in which the station device is the non-AP MLD.

It may be understood that, in this embodiment of this application, the AP MLD allocates one AID to one non-AP MLD, and all stations in the non-AP MLD share the AID.

Optionally, the "a BSSID that can be supported by an access point" mentioned in this application may be a BSSID of a BSS to which the access point belongs. It may be understood that one BSS may have a plurality of BSSIDs. In a small area, there may be a plurality of types of users or users supporting a plurality of services. If different APs are used in the small area, channel interference between different APs cannot be avoided because each AP attempts to find a clean channel. Therefore, IEEE802.11ax proposes that one AP is virtualized into a plurality of APs for different service types or customer types. Therefore, one virtual AP may have one BSSID, that is, one actual AP has a plurality of BSSIDs.

Figure 4:
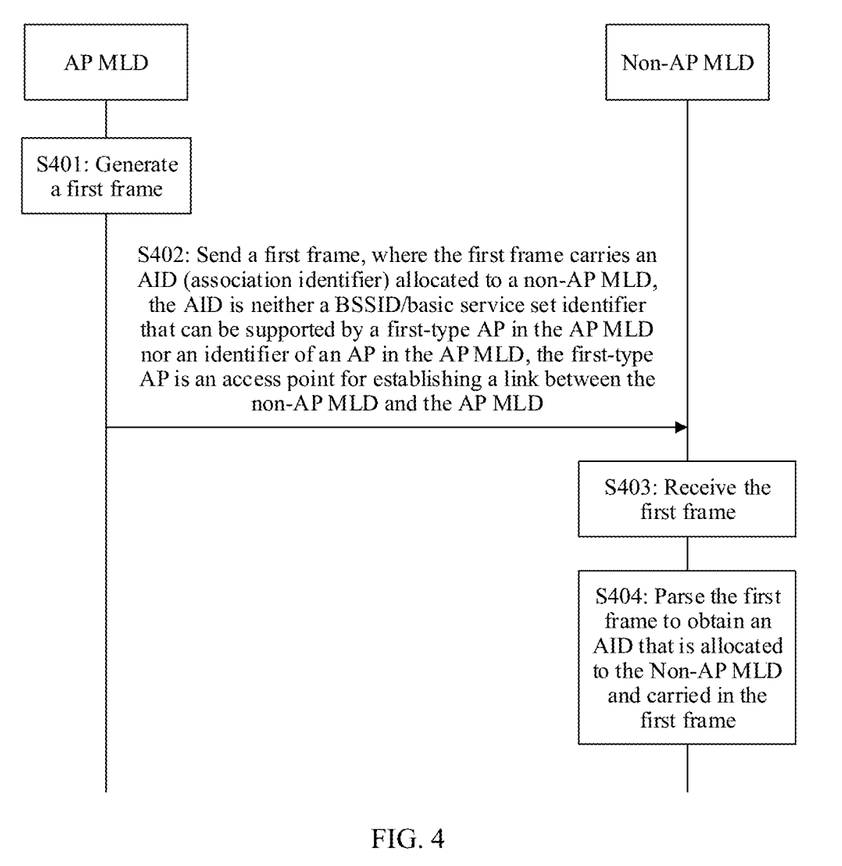
FIG. 4 is a schematic flowchart of an AID allocation method for a multi-link device according to an embodiment of this application.

FIG. 4 is a schematic flowchart of an AID allocation method for a multi-link device according to an embodiment of this application. As shown in FIG. 4, the AID allocation method for the multi-link device includes but is not limited to the following steps.

S401: An AP MLD generates a first frame.

S402: The AP MLD sends a first frame, where the first frame carries an AID allocated to a non-AP MLD, the AID is neither a BSSID that can be supported by a first-type AP in the AP MLD nor an identifier of an AP in the AP MLD, the first-type AP is an access point for establishing a link between the non-AP MLD and the AP MLD.

S403: The non-AP MLD receives the first frame.

S404: The non-AP ML parses the first frame to obtain an AID that is allocated to the non-AP MLD and carried in the first frame.

Optionally, the first frame may be an association response frame or a multi-link association response frame.

Figure 5:
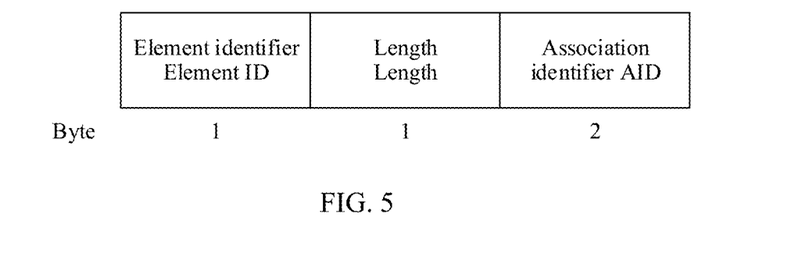
FIG. 5 is a schematic diagram of a frame structure of an AID element according to an embodiment of this application.

Specifically, the non-AP MLD sends a multi-link association request frame to the AP MLD, to request to establish an association relationship with the AP MLD. The AP MLD sends the multi-link association response frame to the non-AP MLD in response to the multi-link association request frame. Correspondingly, the non-AP MLD receives the multi-link association response frame, and parses the multi-link association response frame to obtain the AID that is allocated to the non-AP MLD and carried in the multi-link association response frame. The AID is neither the BSSID that can be supported by the first-type AP in the AP MLD nor the identifier of the AP in the AP MLD. The AID may be carried in an AID element of the multi-link association response frame/association response frame. FIG. 5 is a schematic diagram of a frame structure of an AID element according to an embodiment of this application. As shown in FIG. 5, the AID element includes a 1-byte element identifier, a 1-byte length, and a 2-byte AID.

Optionally, a first-type AP may be an access point for establishing a link (setup links) between a non-AP MLD and an AP MLD. BSSIDs that can be supported by the first-type AP in the AP MLD are $[1, \max(2^{n_1}, 2^{n_2}, \ldots, 2^{n_i}, \ldots, 2^{n_N})-1]$. $2^{n_i}$ may represent a quantity of BSSIDs that can be supported by an $i^{th}$ access point in the first-type access point. N may be a positive integer greater than 1. A quantity of first-type APs may be equal to N. N may be a positive integer greater than 1.

Communication between the AP MLD 100 and the non-AP MLD 300 in FIG. 3*b* is used as an example. Links established between the non-AP MLD 300 and the AP MLD 100 are the link 2 and the link 3. In this case, a "first-type access point" in the AP MLD 100 includes the AP 100-2 corresponding to the link 2 and the AP 100-3 corresponding to the link 3. In other words, the BSSIDs that can be supported by the first-type AP in the AP MLD includes: a BSSID that can be supported by a first access point AP 100-2 in the first-type AP, that is, $[1, 2^{n_1}-1]$, and a BSSID that can be supported by a second access point AP 100-3 in the first-type AP, that is, $[1, 2^{n_2}-1]$. Therefore, the BSSIDs that can be supported by the first-type AP in the AP MLD is a range $[1, \max(2^{n_1}, 2^{n_2})-1]$. It may be understood that $2^{n_1}$ herein represents the BSSID that can be supported by the AP 100-2, and $2^{n_2}$ herein represents the BSSID that can be supported by the AP 100-3.

Similarly, communication between the AP MLD 100 and the non-AP MLD 200 in FIG. 3*b* is used as an example. Links established between the non-AP MLD 200 and the AP MLD 100 are the link 1 and the link 3. In this case, the "first-type access point" in the AP MLD 100 includes the AP 100-1 corresponding to the link 1 and the AP 100-3 corresponding to the link 3. In other words, the BSSIDs that can be supported by the first-type AP in the AP MLD includes: the BSSID that can be supported by the first access point AP 100-1 in the first-type AP, that is, $[1, 2^{n_1}1]$, and the BSSID that can be supported by the second access point AP 100-3 in the first-type AP, that is, $[1, 2^{n_2}-1]$. Therefore, the BSSIDs that can be supported by the first-type AP in the AP MLD is the range $[1, \max(2^{n_1}, 2^{n_2})-1]$. It may be understood that $2^{n_1}$, herein represents the BSSID that can be supported by the AP 100-1, and $2^{n_2}$ herein represents the BSSID that can be supported by the AP 100-3.

Figure 6:
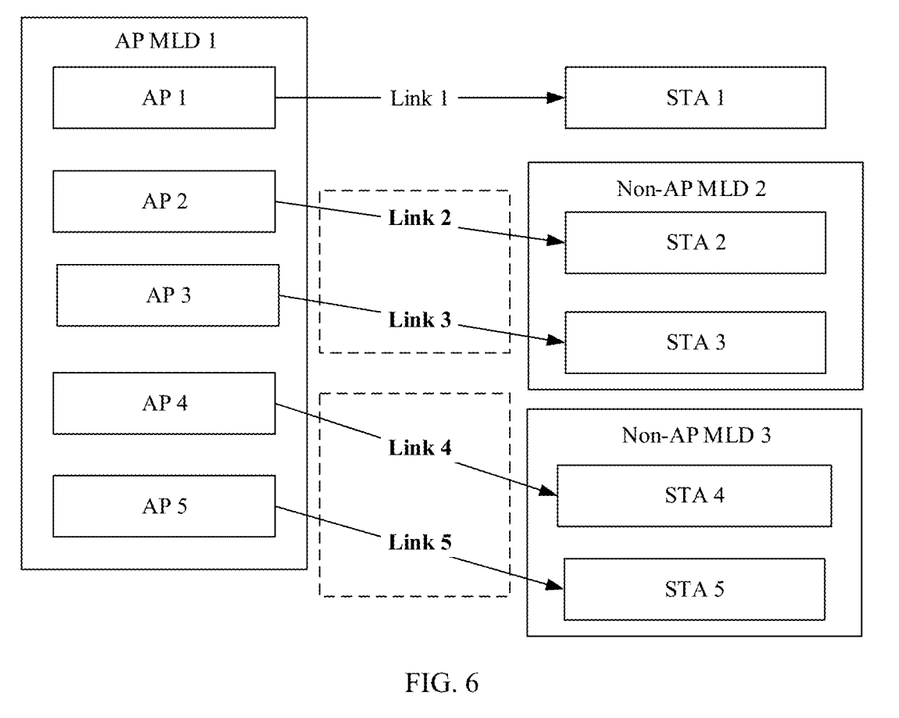
FIG. 6 is a schematic diagram of communication between a non-AP MLD and an AP MLD according to an embodiment of this application.

For another example, FIG. 6 is a schematic diagram of communication between a non-AP MLD and an AP MLD according to an embodiment of this application. As shown in FIG. 6, it is assumed that an AP MLD 1 includes five APs: an AP 1 to an AP 5. A non-AP MLD 2 includes two affiliated stations: a STA 2 and a STA 3. A non-AP MLD 3 includes two affiliated stations: a STA 4 and a STA 5. The STA 1 is a single-link device. The AP MLD 1 may separately communicate with the non-AP MLD 3 through a link 4 and a link 5, communicate with the non-AP MLD 2 through a link 2 and the link 3, and communicate with the STA 1 through a link 1. An example in which the AP MLD 1 communicates with the non-AP MLD 2 is used. Links established between the non-AP MLD 2 and the AP MLD 1 include the link 2 and the link 3. In this case, a first-type access point in the AP MLD 1 includes an AP 2 corresponding to the link 2 and an AP 3 corresponding to the link 3. In other words, in this case, BSSIDs that can be supported by the first-type AP in the AP MLD 1 includes: a BSSID that can be supported by a first access point AP 2 in the first-type AP, that is, $[1, 2^{n_1}-1]$, and a BSSID that can be supported by a second access point AP 3 in the first-type AP, that is, $[1, 2^{n_2}-1]$. Therefore, the BSSIDs that can be supported by the first-type AP in the AP MLD is a range $[1, \max(2^{n_1}, 2^{n_2})-1]$. It may be understood that $2^{n_1}$ herein represents the BSSID that can be supported by the AP 2, and $2^{n_2}$ herein represents the BSSID that can be supported by the AP 3.

Similarly, an example in which the AP MLD 1 communicates with the non-AP MLD 3 is used. Links established between the non-AP MLD 3 and the AP MLD 1 include a link 4 and a link 5. In this case, the first-type access point in the AP MLD 1 includes an AP 4 corresponding to the link 4 and an AP 5 corresponding to the link 5. In other words, in this case, the BSSIDs that can be supported by the first-type AP in the AP MLD 1 includes: a BSSID that can be supported by a first access point AP 4 in the first-type AP, that is, $[1, 2^{n_1}-1]$, and a BSSID that can be supported by a second access point AP 5 in the first-type AP, that is, $[1, 2^{n_2}-1]$. Therefore, the BSSIDs that can be supported by the first-type AP in the AP MLD is a range $[1, \max(2^{n_1}, 2^{n_2})-1]$. It may be understood that $2^{n_1}$ herein represents the BSSID that can be supported by the AP 4, and $2^{n_2}$ herein represents the BSSID that can be supported by the AP 5.

It may be understood that, in this embodiment of this application, BSSIDs that can be supported by some APs in the AP MLD are not allowed to be allocated to a non-AP MLD, so that a range in which allocation is not allowed is narrowed down if it is ensured that no AID ambiguity occurs in a cross-link TIM indication. In this way, a range of AIDs that can be allocated to the non-AP MLD is expanded, and utilization of identifier resources can be improved.

Optionally, an identifier of the AP in the AP MLD may refer to identifiers of all APs in the AP MLD, or refer to an identifier of the first-type AP in the AP MLD. For ease of description, it is assumed below that a quantity of all the APs in the AP MLD is M. Therefore, the identifiers of all the APs in the AP MLD may include M discrete integer values, or include M consecutive integer values. Similarly, the identifier of the first-type AP in the AP MLD may include N discrete integer values, or include N consecutive integer values. Specifically, the identifiers of all the APs/the first-type AP in the AP MLD may be a segment of consecutive integer values following a maximum value of the BSSID that can be supported by the first-type AP. For example, if the maximum value of the BSSID that can be supported by the first-type AP is $\max(2^{n_1}, 2^{n_2}, \ldots, 2^{n_N})-1$, a range of the identifiers of all the APs in the AP MLD is $[\max(2^{n_1}, 2^{n_2}, \ldots, 2^{n_N}), \max(2^{n_1}, 2^{n_2}, \ldots, 2^{n_N})+M]$, and a range of the identifier of the first-type AP in the AP MLD is $[\max(2^{n_1}, 2^{n_2}, \ldots, 2^{n_N}), \max(2^{n_1}, 2^{n_2}, \ldots, 2^{n_N})+N]$. M may be a positive integer greater than 1. N may be less than M. In other words, N may be a subset of M. If all access points of the AP MLD are associated with one non-AP MLD, N may also be equal to M.

In conclusion, an AID carried in a first frame is neither any value in a range $[1, \max(2^{n_1}, 2^{n_2}, \ldots, 2^{n_N})-1]$ nor the identifier of the AP in the AP MLD. Alternatively, the AID carried in the first frame is not any value in a range $[1, \max(2^{n_1}, 2^{n_2}, \ldots, 2^{n_N})-1+M]$ or a range $[1, \max(2^{n_1}, 2^{n_2}, \ldots, 2^{n_N})-1+N]$.

It may be understood that, in other words, when the AP MLD allocates the AID to the non-AP MLD, it is not allowed to allocate any element in a first set to the non-AP MLD. The first set may include a range $[1, \max(2^{n_1}, 2^{n_2}, \ldots, 2^{n_N})-1]$ and the identifier of the AP in the AP MLD. It may be further understood that a range of AIDs allocated by the AP MLD to the non-AP MLD is: a value in a range $[1, 2007]$ except a range $[1, \max(2^{n_1}, 2^{n_2}, \ldots, 2^{n_N})-1]$ and identifiers of M APs of the AP MLD, or a difference set between the range $[1, 2007]$ and the range $[1, \max(2^{n_1}, 2^{n_2}, \ldots, 2^{n_N}), -1+M]$ or the range $[1, \max(2^{n_1}, 2^{n_2}, \ldots, 2^{n_N}-1+N]$, that is, a range $[\max(2^{n_1}, 2^{n_2}, \ldots, 2^{n_N})+M, 2007]$ or a range $[\max(2^{n_1}, 2^{n_2}, \ldots, 2^{n_N})+N, 2007]$. In other words, when the AP MLD allocates the AID to the non-AP MLD, the AID carried in the first frame cannot be less than or equal to $\max(2^{n_1}, 2^{n_2}, \ldots, 2^{n_N})$, and cannot be the identifier of the AP allocated to the AP MLD. $n_i$ is a maximum value (where $n_i$ is the maximum value of the MaxB SSID indicator in a multiple BSSID set is reserved) of a MaxB SSID indicator in a multiple BSSID set.

It may be understood that, when the AP MLD allocates the AID to the non-AP MLD, a BSSID that has been allocated to an AP and/or a BS SID that can be supported by the first-type AP is not allowed to be allocated to a non-AP MLD. Therefore, a more accurate AID can be allocated to the non-AP MLD, and this avoids AID ambiguity in a cross-link TIM indication.

Optionally, in the TIM indication, an AP that sends the cross-link TIM indication in the AP MLD may not need to additionally allocate an identifier to the AP itself, and may directly indicate the AP by using one bit in a bitmap control field. Therefore, one less identifier is allocated to the AP MLD, that is, M APs of the AP MLD have only M−1 identifiers. Therefore, the AID carried in the first frame may not be any value in a range $[1, \max(2^{n_1}, 2^{n_2}, \ldots, 2^{n_N})-1+M-1]$. Similarly, if the AP that sends the cross-link TIM indication in the AP MLD belongs to the first-type AP, identifiers of N first-type APs in the AP MLD include only N−1 identifiers. Therefore, the AID carried in the first frame may not be any value in a range $[1, \max(2^{n_1}, 2^{n_2}, \ldots, 2^{n_N})-1+N-1]$.

It may be understood that in this embodiment of this application, 1 bit of the bitmap control field is used to identify the AP that sends the TIM indication, so that one identifier can be saved, and resources can be saved.

In some feasible implementations, the AID carried in the first frame may not be the BSSID that can be supported by the access point in the AP MLD, or the identifier of the access point in the AP MLD. Specifically, BSSIDs that can be supported by the access point in the AP MLD are $[1, \max(2^{n_1}, 2^{n_2}, \ldots, 2^{n_i}, \ldots, 2^{n_M})-1]$. $2^{n_i}$ may represent a quantity of BSSIDs that can be supported by an $i^{th}$ access point in the AP MLD. A quantity of access points in the AP MLD may be equal to M, and M may be a positive integer greater than 1.

The identifier of the AP in the AP MLD may refer to the identifiers of all the APs in the AP MLD, or refer to the identifier of the first-type AP in the AP MLD. Therefore, the identifiers of all the APs in the AP MLD may include M discrete integer values, or include M consecutive integer values. Similarly, the identifier of the first-type AP in the AP MLD may include N discrete integer values, or include N consecutive integer values. Specifically, the identifiers of all the APs/the first-type AP in the AP MLD may be a segment of consecutive integer values following a maximum value of the BSSIDs that can be supported by all the access points in the AP MLD. For example, if a maximum value of the BSSIDs that can be supported by all the access points in the AP MLD is $\max(2^{n_1}, 2^{n_2}, \ldots, 2^{n_M})-1$, a range of the identifiers of all the APs in the AP MLD is $[\max(2^{n_1}, 2^{n_2}, \ldots, 2^{n_M}),, \max(2^{n_1}, 2^{n_2}, \ldots, 2^{n_M})+M]$, and a range of the identifiers of the first-type AP in the AP MLD is $[\max(2^{n_1}, 2^{n_2}, \ldots, 2^{n_M}), \max(2^{n_1}, 2^{n_2}, \ldots, 2^{n_M})+N]$.

In conclusion, an AID carried in a first frame is neither any value in a range $[1, \max(2^{n_1}, 2^{n_2}, \ldots, 2^{n_M})-1]$ nor the identifier of the AP in the AP MLD. Alternatively, the AID carried in the first frame is not any value in a range $[1, \max(2^{n_1}, 2^{n_2}, \ldots, 2^{n_M})-1+M]$, a range $[1, \max(2^{n_1}, 2^{n_2}, \ldots, 2^{n_M})-1+M-1]$, in a range $[1, \max(2^{n_1}, 2^{n_2}, \ldots, 2^{n_M})-1+N]$, or a range $[1, \max(2^{n_1}, 2^{n_2}, \ldots, 2^{n_M})-1+N-]$.

In this embodiment of this application, the AP MLD generates and sends the first frame, where the first frame carries the AID allocated to the non-AP MLD. The AID is neither the BSSID that can be supported by the first-type access point in the AP MLD nor the identifier of the AP in the AP MLD. The first-type access point is the access point for establishing the link between the non-AP MLD and the AP MLD. In this embodiment of this application, when the AID is allocated to the non-AP MLD, a BSSID that has been allocated to an AP and/or a BSSID that can be supported by the first-type AP is not allowed to be allocated to the non-AP MLD. Therefore, a more accurate AID can be allocated to the non-AP MLD, and this avoids AID ambiguity in the cross-link TIM indication.

In an optional embodiment, if the station device is a single-link STA, the single-link STA sends an association request frame to the AP MLD to request to establish an association relationship with the AP MLD. The AP MLD sends an association response frame to the non-AP MLD in response to the association request frame. The association response frame carries the AID allocated to the non-AP MLD. The AID may be carried in an AID element of the association response frame. The AID is neither the identifier of the AP in the AP MLD nor the BSSID that can be supported by the AP that establishes the association with the single-link STA in the AP MLD.

Optionally, the AID is neither any value in a range $[1, 2^{n_j}-1]$ nor the identifiers of all the APs in the AP MLD. Alternatively, the AID is not any value in the range $[1, 2^{n_j}-1+M]$. $2^{n_j}$ represents the quantity of the BSSIDs that can be supported by the AP associated with the single-link STA in the AP MLD. In other words, when the AP MLD allocates the AID to the single-link STA, the AID cannot be less than $2^{n_j}-1$.

In another optional embodiment, when the AP MLD uses one identifier, for example, the identifier of the AP MLD is 0 by default, that is, a plurality of APs in the AP MLD share the identifier (that is, the identifier 0), the AID carried in the first frame that is sent to the non-AP MLD by the AP MLD is not the BSSID that can be supported by the first-type access point in the AP MLD. The first-type access point is an access point for establishing a link between the non-AP MLD and the AP MLD. In other words, the AID carried in the first frame is not any value in the range $[1, \max(2^{n_1}, 2^{n_2}, \ldots, 2^{n_i}, \ldots 2^{n_N})-1]$. N is a quantity of first-type access points, and $2^{n_i}$ represents the quantity of BSSIDs that can be supported by an $i^{th}$ access point in the first-type access points.

The foregoing content describes in detail the methods provided in this application. To better implement the foregoing solutions in embodiments of this application, embodiments of this application further provide corresponding apparatuses or devices.

In embodiments of this application, functional modules in the multi-link device may be defined based on the foregoing method examples. For example, each functional module may be defined in a correspondence to each function, or two or more functions may be integrated in one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 7:
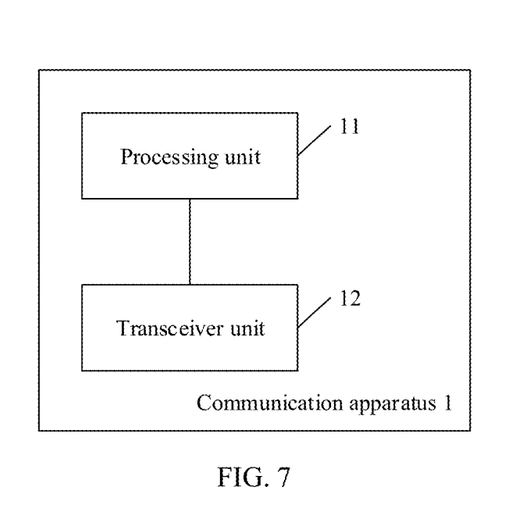
FIG. 7 is a schematic diagram of a structure of a communication apparatus according to an embodiment of this application.

When an integrated unit is used, FIG. 7 is a schematic diagram of a structure of a communication apparatus according to an embodiment of this application. A communication apparatus 1 may be an AP MLD or a chip in an AP MLD, for example, a Wi-Fi chip. As shown in FIG. 7, the communication apparatus 1 includes a processing unit 11 and a transceiver unit 12.

The processing unit 11 is configured to generate a first frame. The transceiver unit 12 is configured to send the first frame. The first frame carries an AID allocated to a station device. The AID is neither a BSSID that can be supported by a first-type access point in an access point multi-link device nor an identifier of an AP in the access point multi-link device. The first-type access point is an access point for establishing a link between the station device and the access point multi-link device.

The communication apparatus 1 in this embodiment of this application has any function of the AP MLD in the foregoing method. Details are not described herein again.

Figure 8:
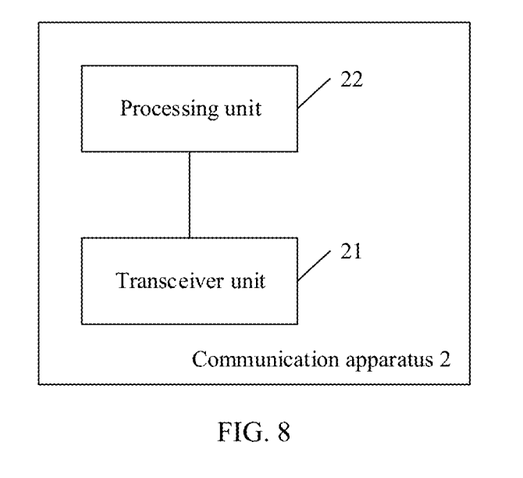
FIG. 8 is a schematic diagram of another structure of a communication apparatus according to an embodiment of this application.

FIG. 8 is a schematic diagram of another structure of a communication apparatus according to an embodiment of this application. A communication apparatus 2 may be a non-AP MLD or a chip in a non-AP MLD, for example, a Wi-Fi chip. As shown in FIG. 8, the communication apparatus 2 includes a transceiver unit 21 and a processing unit 22.

The transceiver unit 21 is configured to receive a first frame. The processing unit 22 is configured to parse the received first frame to obtain an AID that is allocated to a station device and carried in the first frame. The AID is neither a BSSID that can be supported by a first-type access point in an access point multi-link device nor an identifier of an access point in the access point multi-link device. The first-type access point is an access point for establishing a link between the station device and the access point multi-link device.

The communication apparatus 2 in this embodiment of this application has any function of the non-AP MLD in the foregoing method. Details are not described herein again.

The foregoing describes the AP MLD in embodiments of this application. The following describes possible product forms of the AP MLD and the non-AP MLD. It should be understood that any product in any form that has the function of the AP MLD described in FIG. 7 and any product in any form that has the function of the non-AP MLD described in FIG. 8 fall within the protection scope of embodiments of this application. It should be further understood that the following description is merely an example, and product forms of the AP MLD and the non-AP MLD in embodiments of this application are not limited thereto.

As a possible product form, the AP MLD described in this embodiment of this application may be implemented by using a general bus architecture.

The AP MLD includes a processor and a transceiver internally connected to and communicating with the processor. The processor is configured to generate a first frame. The transceiver is configured to send the first frame, where the first frame carries an AID allocated to a station device. The AID is neither a BSSID that can be supported by a first-type access point in the access point multi-link device nor an identifier of an access point in the access point multi-link device. The first-type access point is an access point for establishing a link between the station device and the access point multi-link device. Optionally, the AP MLD may further include the memory, and the memory is configured to store the instructions executed by the processor.

The non-AP MLD includes a processor and a transceiver internally connected to and communicating with the processor. The transceiver is configured to receive the first frame. The processor is configured to parse the received first frame to obtain the AID that is allocated to the station device and carried in the first frame. The AID is neither the BSSID that can be supported by the first-type access point in the access point multi-link device nor the identifier of the access point in the access point multi-link device. The first-type access point is the access point for establishing the link between the station device and the access point multi-link device. Optionally, the AP MLD may further include the memory, and the memory is configured to store the instructions executed by the processor.

In a possible product form, the AP MLD described in this embodiment of this application may be implemented by a general-purpose processor.

The general purpose processor for implementing the AP MLD includes a processing circuit and an input/output interface internally connected to and communicating with the processing circuit. The processing circuit is configured to generate a first frame. The input/output interface is configured to send the first frame, where the first frame carries an AID allocated to a station device. The AID is neither a BSSID that can be supported by a first-type access point in the access point multi-link device nor an identifier of an access point in the access point multi-link device. The first-type access point is an access point for establishing a link between the station device and the access point multi-link device. Optionally, the general-purpose processor may further include a storage medium. The storage medium is configured to store instructions executed by the processing circuit.

The general purpose processor for implementing the non-AP MLD includes a processing circuit and an input/output interface internally connected to and communicating with the processing circuit. The input/output interface is configured to receive the first frame. The processing circuit is configured to parse the received first frame to obtain the AID that is allocated to the station device and carried in the first frame. The AID is neither the BSSID that can be supported by the first-type access point in the access point multi-link device nor the identifier of the access point in the access point multi-link device. The first-type access point is the access point for establishing the link between the station device and the access point multi-link device. Optionally, the general-purpose processor may further include a storage medium. The storage medium is configured to store instructions executed by the processing circuit.

As a possible product form, the AP MLD or the non-AP MLD described in this embodiment of this application may further be implemented by using the following components: one or more FPGAs (field programmable gate arrays), a PLD (programmable logic device), a controller, a state machine, gate logic, a discrete hardware component, any other suitable circuit, or any combination of circuits that can perform various functions described in this application.

It should be understood that the communication apparatuses in the foregoing various product forms have any function of the AP MLD in the method embodiments. Details are not described herein again.

An embodiment of this application further provides a computer-readable storage medium. The computer-readable storage medium stores computer program code. When the processor executes the computer program code, an electronic device performs the method in the foregoing embodiments.

An embodiment of this application further provides a computer program product. When the computer program product runs on a computer, the computer is enabled to perform the method in the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the method in the foregoing embodiments.

An embodiment of this application further provides a wireless communication system, including an AP MLD and a station device (for example, a non-AP MLD). The AP MLD and the station device may perform the method in the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium, where the communication medium includes any medium that facilitates transmission of a computer program from one place to another. The storage medium may be any available medium accessible to a general-purpose or a special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. An association identifier (AID) allocation method for a non-access point multi-link device, comprising:
   receiving, a first frame from an access point multi-link device; and
   parsing, the first frame, wherein the first frame carries a value of an AID allocated to the non-access point multi-link device, the value of the AID is not a value of a basic service set identifier (BSSID) that can be supported by a first-type access point in the access point multi-link device, and the first-type access point is an access point on a link setup between the non-access point multi-link device and the access point multi-link device.

2. The method according to claim 1, wherein the AID is not an identifier corresponding to an access point in the access point multilink device indicated in a traffic indication map (TIM).

3. The method according to claim 1, wherein values of the BSSID that can be supported by the first-type access point in the access point multi-link device comprises:
   $[1, \max(2^{n_1}, 2^{n_2}, \ldots, 2^{n_i}, \ldots 2^{n_N})-1]$, wherein
   N is a quantity of first-type access points, and $2^{n_i}$ represents a quantity of BSSIDs that can be supported by an $i^{th}$ access point in the first-type access points.

4. The method according to claim 1, wherein an identifier of any access point in the access point multi-link device is any of M−1 consecutive values.

5. The method according to claim 4, wherein the AID is not any value in the following range:
   $[1, \max(2^{n_1}, 2^{n_2}, \ldots, 2^{n_N})-1M-1]$, wherein
   N is a quantity of the first-type access points, $2^{n_i}$ represents a quantity of BSSIDs that can be supported by the first-type access point, and M is a number equal to or greater than N.

6. The method according to claim 5, wherein M is a quantity of access points of the access point multi-link device.

7. The method according to claim 1, wherein a field containing the value of the AID is two bytes.

8. The method according to claim 1, wherein the value of the AID is not a value of an identifier of an access point in the access point multi-link device.

9. An apparatus applied for a non-access point multi-link device, comprising:
   at least one processor, and a memory storing instructions for execution by the at least one processor;
   wherein, when executed, the instructions cause the access point multi-link device to perform operations comprising:
   receiving, a first frame from an access point multi-link device; and
   parsing, the first frame, wherein the first frame carries a value of an AID allocated to the non-access point multi-link device, the value of the AID is not a value of a basic service set identifier (BSSID) that can be supported by a first-type access point in the access point multi-link device, and the first-type access point is an access point on a link setup between the non-access point multi-link device and the access point multi-link device.

10. The apparatus according to claim 9, wherein the AID is not an identifier corresponding to an access point in the access point multilink device indicated in a traffic indication map (TIM).

11. The apparatus according to claim 9, wherein values of the BSSID that can be supported by the first-type access point in the access point multi-link device comprises:
    $[1, \max(2^{n_1}, 2^{n_2}, \ldots, 2^{n_i}, \ldots 2^{n_N})-1]$, wherein
    N is a quantity of first-type access points, and $2^{n_i}$ is i represents a quantity of BSSIDs that can be supported by an $i^{th}$ access point in the first-type access points.

12. The apparatus according to claim 9, wherein an identifier of any access point in the access point multi-link device is any one of M−1 consecutive values.

13. The apparatus according to claim 12, wherein the AID is not any value in the following range:
    $[1, \max(2^{n_1}, 2^{n_2}, \ldots, 2^{n_N})-1+M-1]$, wherein
    N is a quantity of the first-type access points, $2^{n_i}$ represents a quantity of BSSIDs that can be supported by the first-type access point, and M is a number equal to or greater than N.

14. The apparatus according to claim 13, wherein M is a quantity of access points of the access point multi-link device.

15. The apparatus according to claim 9, wherein a field containing the value of the AID is two bytes.

16. The apparatus according to claim 9, wherein the value of the AID is not a value of an identifier of an access point in the access point multi-link device.

17. A non-transitory computer-readable storage medium for a non-access point multi-link device, wherein the computer-readable storage medium stores instructions, and when the instructions are executed, the instructions cause the non-access point multi-link device to perform operations comprising:
    receiving, a first frame from an access point multi-link device; and
    parsing, the first frame, wherein the first frame carries a value of an AID allocated to the non-access point multi-link device, the value of the AID is not a value of a basic service set identifier (BSSID) that can be supported by a first-type access point in the access point multi-link device, and the first-type access point is an access point on a link setup between the non-access point multi-link device and the access point multi-link device.

18. The non-transitory computer-readable storage medium according to claim 17, wherein the AID is not an identifier corresponding to an access point in the access point multilink device indicated in a traffic indication map (TIM).

19. The non-transitory computer-readable storage medium according to claim 17, wherein values of the BSSID that can be supported by the first-type access point in the access point multi-link device comprises:

[1, max($2^{n_1}, 2^{n_2}, \ldots, 2^{n_i}, \ldots 2^{n_N}$)−1], wherein N is a quantity of first-type access points, and $2^{n_i}$ represents a quantity of BSSIDs that can be supported by an $i^{th}$ access point in the first-type access points.

20. The non-transitory computer-readable storage medium according to claim 17, wherein a field containing the value of the AID is two bytes.

\* \* \* \* \*